US008366863B2

(12) United States Patent
Huenig et al.

(10) Patent No.: US 8,366,863 B2
(45) Date of Patent: Feb. 5, 2013

(54) METHOD FOR PRODUCING BONDED MINERAL WOOL AND BINDER THEREFOR

(75) Inventors: Hagen Huenig, Dosseinheim (DE); Eva Wagner, Altrip (DE)

(73) Assignee: Saint-Gobain Isover, Courbevoie (FR)

( * ) Notice: Subject to any disclaimer, the term of this patent is extended or adjusted under 35 U.S.C. 154(b) by 311 days.

(21) Appl. No.: 11/993,750

(22) PCT Filed: Jun. 26, 2006

(86) PCT No.: PCT/EP2006/063565
§ 371 (c)(1),
(2), (4) Date: May 28, 2008

(87) PCT Pub. No.: WO2006/136614
PCT Pub. Date: Dec. 28, 2006

(65) Prior Publication Data
US 2010/0175826 A1      Jul. 15, 2010

(30) Foreign Application Priority Data

Jun. 24, 2005   (DE) .................. 10 2005 029 479

(51) Int. Cl.
*B32B 37/12*  (2006.01)
*C07C 211/02* (2006.01)
*C07C 215/06* (2006.01)
*C09K 3/00*   (2006.01)

(52) U.S. Cl. ......... 156/296; 564/463; 564/503; 106/499
(58) Field of Classification Search .............. 156/296; 564/463, 503; 106/499
See application file for complete search history.

(56) References Cited

U.S. PATENT DOCUMENTS

| 5,270,434 A | 12/1993 | Tetart et al. |
| 6,090,883 A | 7/2000 | Fouquay et al. |

FOREIGN PATENT DOCUMENTS

| EP | 0 810 981 B1 | 12/1997 |
| EP | 810981 B1 * | 11/2001 |
| GB | 851414 A | 10/1960 |
| WO | WO 01/00699 A2 | 1/2001 |
| WO | WO 0100699 A2 * | 1/2001 |

* cited by examiner

*Primary Examiner* — Katarzyna Wyrozebski Lee
*Assistant Examiner* — Daniel Lee
(74) *Attorney, Agent, or Firm* — Oblon, Spivak, McClelland, Maier & Neustadt, L.L.P.

(57) ABSTRACT

The present invention relates to a binder for the production of bonded mineral wool, wherein a phenol-formaldehyde-binder is applied onto the still hot fibers after the fiberization of a mineral wool, using a binder that comprises hydroxylamine or an amino alcohol with the following general formula (I) wherein R1 and R2 are the same or different from each other, and independently are hydrogen, a linear or branched, saturated or unsaturated aliphatic hydrocarbon with 1-12 carbon atoms, a saturated or unsaturated alicyclic or heterocyclic hydrocarbon with 5-8 carbon atoms, a carbocyclic or heterocyclic aromatic hydrocarbon with 5-12 ring members or a chain-like or branched alkylether with 1-50 alkoxy units or a chain-like or branched alkylamine with 1-50 alkylamine units; and R3 is a linear or branched, saturated or unsaturated aliphatic hydrocarbon with 1-12 carbon atoms, a saturated or unsaturated alicyclic or heterocyclic hydrocarbon with 5-8 carbon atoms, a carbocyclic or heterocyclic aromatic hydrocarbon with 5-12 ring members or a chain-like or branched alkylether with 1-50 alkoxy units or a chain-like or branched alkylamine with 1-50 alkylamine units.

17 Claims, 2 Drawing Sheets

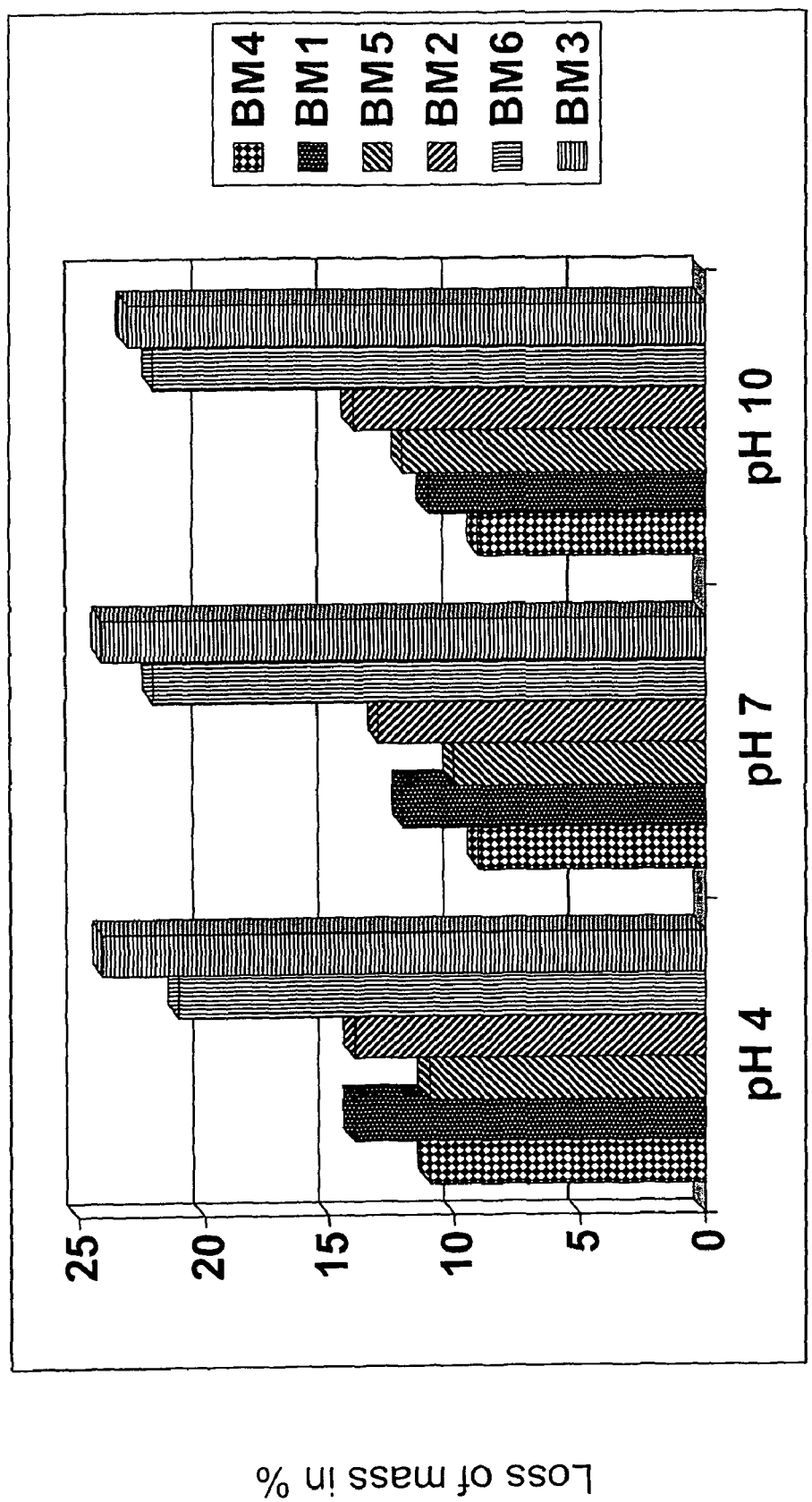

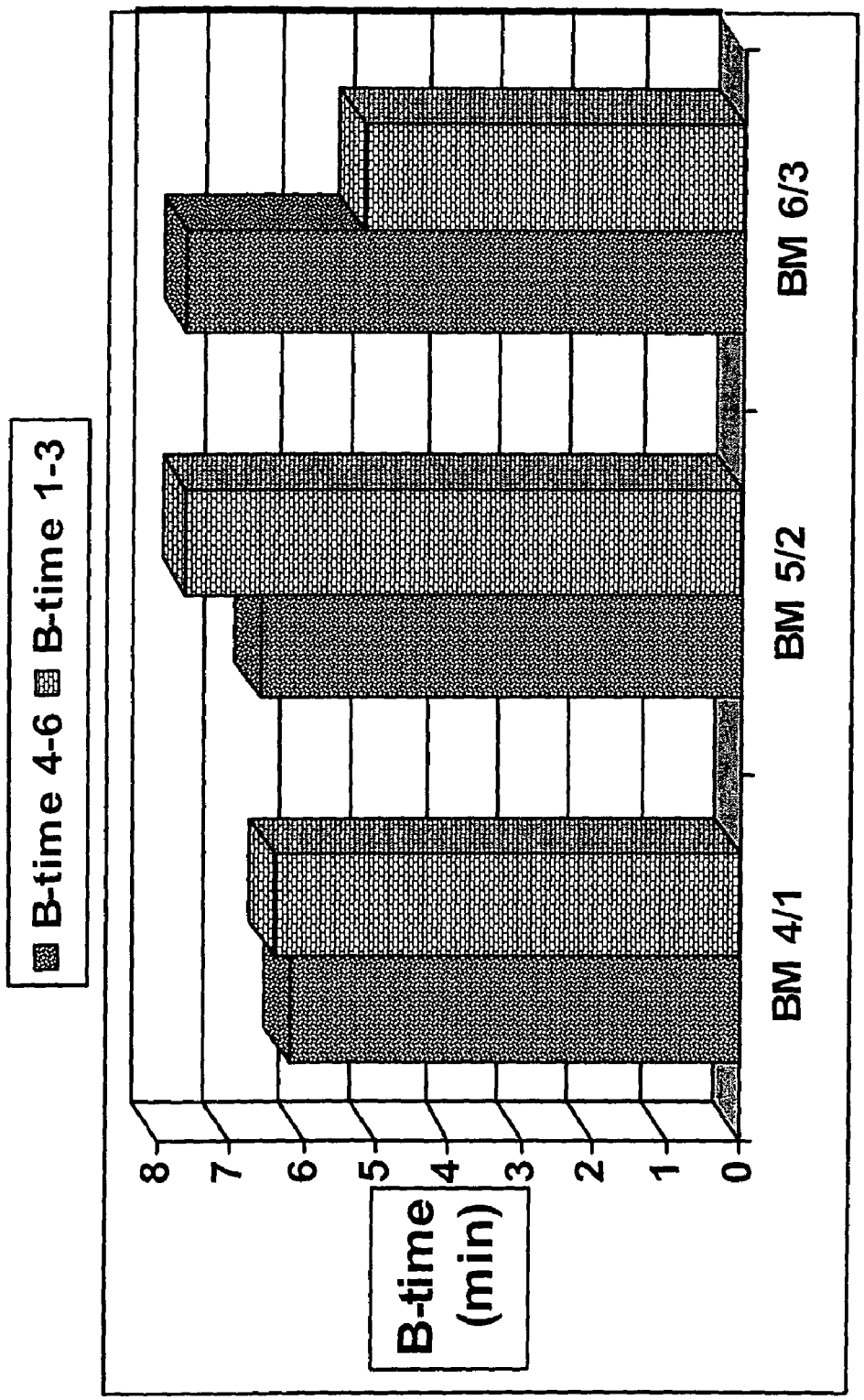

METHOD FOR PRODUCING BONDED MINERAL WOOL AND BINDER THEREFOR

CROSS-REFERENCE TO RELATED APPLICATIONS

This application is a 371 of PCT/EP2006/063565 filed Jun. 26, 2006 and claims the benefit of DE 10 2005 029 479.0 filed Jun. 24, 2005.

The present invention relates to a method for producing bonded mineral wool in accordance with the preamble of claim 1, a bonded mineral wool product in accordance with claim 11, as well as a binder for producing bonded mineral wool according to claim 12.

After fiberization in the production of bonded mineral wool products from a glass melt or mineral melt, it has for a long time proved advantageous to apply a phenol-formaldehyde resin-based binder onto the still hot fibers.

Such binders are well known in the prior art. U.S. Pat. No. 3,231,349 of Jan. 25, 1966, discloses for example the production of glass- and mineral fibers bonded with an aqueous dispersion of a binder on the base of a phenolic resin, maleic acid, the anhydride of which, or the equivalents of which, are bonded with ammonium hydroxide with glucose and sugar type compounds added.

From U.S. Pat. No. 4,339,361 aqueous thermosetting phenol-formaldehyde resin-preparations are known as binder for mineral wool products, on the one hand comprising a molar ratio of phenol and formaldehyde of 1:2.3 to 1:5, and on the other hand potentially containing sugar type compounds, urea and ammonia.

European Patent Specification EP 0 810 981 B1 discloses a method for manufacturing a mineral wool-based product comprising the following steps:

Preparation of an Aqueous Preparation of a Phenol-Formaldehyde Resin with the Following Components:

Phenol and formaldehyde in a molar ratio of 1:2.8 to 1:6, ammonia; and a sugar preparation; applying of the (total) preparation onto the mineral wool; and curing of the mineral wool while forming the product.

Further, EP 0 810 981 B1 discloses the adjustment of the pH of the binder dispersion to an alkaline level between 8 and 9.25 by means of $NH_3$. According to the prior art of EP 0 810 981 B1, the sugar preparation may comprise the saccharides glucose, fructose, sucrose (cane sugar), maltose as well as sugar syrup, sugar molasses and/or dextrin.

The concentration of the sugar preparation in aqueous solution in EP 0 810 981 B1 amounts to 1 to 80 wt %.

According to the teaching of EP 0 810 981 B1, the emission of ammonia is to be reduced by adding the sugar preparation to the binder resin when producing the mineral fibers, and bonding those fibers with an ammonia-containing phenol-formaldehyde resin.

Starting from the prior art of EP 0 810 981 B1, it is an object of the present invention to find a substitute for $NH_3$ that is more advantageous with respect to work-place safety, more environmentally friendly as well as more profitable.

With regard to process technology, this object is attained by the characterising features of claim 1, with regard to product technology, it is attained by the features of claim 11 and with regard to a binder, it is attained by the characterising features of claim 12.

The present invention particularly relates to a method for producing bonded mineral wool, in which method after the fiberization of a mineral melt a phenol-formaldehyde-binder is applied onto the still hot fibers, using a binder comprising hydroxylamine or an amino alcohol having the following general formula:

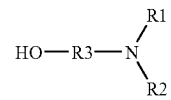

wherein R1 and R2 are the same or different from each other, and independently are hydrogen, a linear or branched, saturated or unsaturated aliphatic hydrocarbon with 1-12 carbon atoms, a saturated or unsaturated alicyclic or heterocyclic hydrocarbon with 5-8 carbon atoms, a carbocyclic or heterocyclic aromatic hydrocarbon with 5-12 ring members or a chain-like or branched alkyl ether with 1-50 alkoxy units or chain-like or branched alkylamine with 1-50 alkylamine units and R3 is a linear or branched, saturated or unsaturated aliphatic hydrocarbon with 1-12 carbon atoms, a saturated or unsaturated alicyclic or heterocyclic hydrocarbon with 5-8 carbon atoms, a carbocyclic or heterocyclic aromatic hydrocarbon with 5-12 ring members or a chain-like or branched alkyl ether with 1-50 alkoxy units or chain-like or branched alkylamine with 1-50 alkylamine units.

Surprisingly, it was found out that mineral wool products produced with the binder of the present invention exhibit increased strength and, generally, improved water resistance or hydrolytic resistance, respectively, in spite of the introduction of additional functional groups into the binder, promoting the dissolution in water.

According to the present invention, it is preferred to use ethanolamine as it is the simplest representative of amino alcohols. Ethanolamine is more alkaline than $NH_3$ and is commercially available at a reasonable price. It reacts perfectly with unreacted formaldehyde, does practically not smell of $NH_3$ when the binder is mixed, if used in the necessary low concentration of normally 1.0 percent by weight, and, finally, only a fractional amount of the $NH_3$ otherwise needed, is necessary. As the absolute amount of amino alcohol that has to be added is much lower than the amount of $NH_3$ that has to be added in the prior art, the use of amino alcohols and especially ethanolamine does virtually not involve additional costs or is even cheaper than the use of $NH_3$.

As the balance of the decomposition reaction of the amines to $NH_3$ is predominantly in favour of amines, the $NH_3$-concentration is drastically reduced in this working place, already when mixing the binder for the use in the production line, so that potential dangers to the health of the employees caused by inhalation of $NH_3$ are eliminated.

The same is true for applying the binder after the fiberization onto the still hot fibers. As a result of the reduced feed of $NH_3$ and due to the specific conditions from retention time and temperature during cooling of the fibers, it is an important advantage of the present invention that the emission of $NH_3$ during this procedural step is practically reduced to zero. Thus, the emission values of $NH_3$ at this working place are also reduced to values that are negligible and completely uncritical for health.

A preferred embodiment of the present invention is to further add to the binder a sugar-containing preparation, in particular molasses, preferably beet root molasses.

On the one hand this leads to the binding of $NH_3$ that potentially has been created from the added amine during cooling of the fibers, and on the other hand it has surprisingly turned out that fewer amino alcohols are needed. This way it is possible to advantageously reduce the amount of binder, i.e. a potential source of emission, introduced.

After this procedural step, a curing procedure is performed, in which the liquid binder polymerises to obtain a solid bond. During this curing procedure, the sugar-containing preparation binds into potentially created decomposition products right into the created polymer structure, or suppresses the creation of these decomposition products, respectively. To sum it up, an advantageous reduction of potential emissions of decomposition products may result in a reduction of environmental pollution.

One binder of the present invention contains a level of amino alcohol, and particularly a level of ethanolamine, of approx. 0.05 to 4 percent by weight, particularly of approx. 0.05 to 1.5 percent by weight, more preferably of 0.1 to 1.0 percent by weight, most preferably of 0.5 percent by weight.

It is further preferred to additionally add ammonium salt, preferably ammonium sulphate, e.g. in a concentration of approx. 0.1 to 3.0 percent by weight, particularly preferably of approx. 1.0 percent by weight, to the binder.

The preferred binder contains a concentration of ethanolamine of approx. 0.5 percent by weight and a concentration of ammonium sulphate of approx. 1.0 percent by weight.

The invention further relates to a bonded mineral wool product obtainable according to the method of the present invention.

Another object of the present invention is a binder for producing a phenol-formaldehyde resin-based bonded mineral wool, characterised in that it contains hydroxylamine or an amino alcohol of the following general formula:

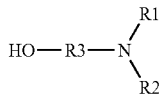

wherein R1 and R2 are the same or different from each other, and independently are hydrogen, a linear or branched, saturated or unsaturated aliphatic hydrocarbon with 1-12 carbon atoms, a saturated or unsaturated alicyclic or heterocyclic hydrocarbon with 5-8 carbon atoms, a carbocyclic or heterocyclic aromatic hydrocarbon with 5-12 ring members or a chain-like or branched alkyl ether with 1-50 alkoxy units or chain-like or branched alkylamine with 1-50 alkylamine units and R3 is a linear or branched, saturated or unsaturated aliphatic hydrocarbon with 1-12 carbon atoms, a saturated or unsaturated alicyclic or heterocyclic hydrocarbon with 5-8 carbon atoms, a carbocyclic or heterocyclic aromatic hydrocarbon with 5-12 ring members or a chain-like or branched alkyl ether with 1-50 alkoxy units or chain-like or branched alkylamine with 1-50 alkylamine units.

Ethanolamine is used as a preferred amino alcohol, nevertheless, other amino alcohols of the described formula can be used as well for the purposes of the present invention. Suitable as alkanol residue within the amino alcohol are a hydroxyethyl-residue, an oxyalkoxyl-residue, a hydroxypropyl-residue as well as the hydroxybutyl-residue and the correspondingly branched iso-hydroxyalkyl-residues, as they are easily technically available.

According to the present invention, it is preferred that the binder comprises the sugar-containing preparation in a concentration of 0.5 to 25 percent by weight.

The advantage of adding a sugar-containing preparation, e.g. in form of molasses, particularly from sugar beets, is, among others, that with glass wool up to approx. 15% relating to binder molasses and with mineral wool/rock wool approx. 10% relating to binder molasses of binder can be saved.

Further advantages and features of the present invention will emerge from the description of preferred embodiments as well as from the drawing.

It shows:

FIG. 1: The hydrolytic stability of two binder resins according to the present invention compared with the prior art comprising $NH_3$ at different pH values.

FIG. 2: The gelling times of two binder resins according to the invention at 130° C. compared to prior art comprising $NH_3$; and For the purposes of the present invention and especially for the preferred embodiments, some terms, parameters and abbreviations are defined in the following:
P=phenol;
F=formaldehyde;
%=% by weight;
parts=parts by weight

EXAMPLES

Several tests were performed with a binder in which $NH_3$ had been replaced by an amino alcohol and the mineral wool products produced were subjected to different tests in order to evaluate the quality by means of quality characteristics such as stability, water repellent properties and optical appearance.

The results of these tests are shown in tables 1 to 4.

The binder of the example contained ethanolamine as amino alcohol. Similar results were, however, also achieved with short-chain amino alcohols.

As in the standard procedure, the binders used for the tests were jetted in the hood onto the still hot fibers.

They exhibited the following composition as to quantity:
Resin 1: partially neutralised phenol-formaldehyde resin (P:F=1:3.2) catalysed with sodium was mixed with urea to obtain a premix of the following composition: resin 70%/urea 30%.
Resin 2: partially neutralised phenol-formaldehyde resin (P:F=1:3.2) catalysed with sodium was mixed with urea to obtain a premix of the following composition: resin 60%/urea 40%.
Resin 3: partially neutralised phenol-formaldehyde resin (P:F=1:3.3) catalysed with sodium was mixed with urea to obtain a premix of the following composition: resin 65%/urea 35%.

The corresponding resins were mixed with additional loading agents to obtain the binders 1-3.

The data refer to 100 parts of resin.

Binder 1: resin 1, 3 parts ammonium sulphate, 2.4 parts ammonia, 0.4 part 3-aminotriethoxysilane
Binder 2: resin 2, 3 parts ammonium sulphate, 2.4 parts ammonia, 0.4 part 3-aminotriethoxysilane
Binder 3: resin 3, 1.2 part ammonium sulphate, 0.9 part ammonia, 0.2 part 3-aminotriethoxysilane A façade insulation board consisting of rock wool and exhibiting an apparent density of 145 kg/m³ and clamping felt consisting of glass wool and exhibiting an apparent density of 20 kg/m³ were produced as mineral wool products.

The production of mineral wool products on the basis of resin 1 and 2 was trouble-free. No striking changes as to e.g. thermal effects, changes in colour, precipitations or a strong bad smell were observed. The pre-made binders, the so called sizing agents (encollages), were used in tests made by the applicant. Before the test, samples were drawn for reference. Approximately 20 minutes after starting the test, samples were drawn and the behaviour of the encollages in the hood was evaluated. It was found out that no increased unpleasant smell occurred by the use of the binder according to the invention, and the final product could not be distinguished optically from the standard products. No pre-curing was observed. The samples drawn were examined as to their product characteristics.

Additionally, the processability of encollage with ethanolamine and molasses as well as the influence of added molasses were tested as to changes in their product characteristics. The binders used had the following composition as to quantity:

The corresponding resins and additional loading agents were mixed into the binders 4-6.

The data given refer to 100 parts of resin.

Binder 4; Resin 1, 1 part ammonium sulphate, 0.5 part ethanolamine, 0.4 part 3-aminotriethoxysilane, 10 parts sugar beet molasses Binder 5: Resin 2, 1 part ammonium sulphate, 0.5 part ethanolamine, 0.4 part 3-aminotriethoxysilane, 10 parts sugar beet molasses Binder 6: Resin 3, 1 part ammonium sulphate, 0.2 part ethanolamine, 0.2 part 3-aminotriethoxysilane, 10 parts sugar beet molasses A façade insulation board consisting of rock wool and exhibiting an apparent density of 145 kg/m$^3$ and clamping felt consisting of glass wool and exhibiting an apparent density of 20 kg/m$^3$ were produced as mineral wool products. Test pieces were created from the products and tested according to the corresponding test methods. At first, the results of the testing of the façade insulation panel are shown in tables 1 and 2.

TABLE 1

| Determination of | | BINDER 1 | BINDER 4 |
|---|---|---|---|
| nominal thickness (dN) | mm | 100 | 100 |
| thickness at 0.05 kN/m$^2$ | mm | 101 | 100 |
| volume at 0.05 kN/m$^2$ | dm$^3$ | 4.04 | 3.98 |
| gross density at nominal thickness | kg/m$^3$ | 145.9 | 150.5 |
| gross density at 0.05 kN/m$^2$ | kg/m$^3$ | 144.5 | 151.2 |
| sample weight, dry | g | 584 | 602 |
| sample weight, wet | g | 589 | 610 |
| weight increase 24 h | g | 6 | 8 |
| water absorption 24 h | kg/m$^2$ | 0.1 | 0.2 |
| maximal admissible water absorption after 24 h | kg/m$^2$ | desired value $\leq 1.0$ | desired value $\leq 1.0$ |
| sample weight, dry | g | 584 | 608 |
| sample weight, wet, after 28 d | g | 595 | 621 |
| weight increase 28 d | g | 11 | 13 |
| water absorption 28 d | kg/m$^2$ | 0.3 | 0.3 |
| maximal admissible water absorption after 28 d | kg/m$^2$ | desired value $\leq 3.0$ | desired value $\leq 3.0$ |

It is very important for façade insulation material to exhibit strongly delayed water absorption as well as a good mechanical strength. Thus, a tearing test is carried out to test the strength of the particular product, in addition to testing the water absorption that rises surprisingly despite additionally introduced hydrophilic groups. To carry out the test, standardised test pieces are glued between two metal plates having two loops and are then torn into pieces in a suitable measuring device. As façade insulation material has also to be plastered, not only the untreated insulation material but also insulation material that has been plastered with commercial mortar were tested. The measurements of plastered and unplastered insulation material are analogue. In the ideal case, there is no difference in strength to be found between the conditions of both. The data given in table 2 show, that the mechanical strength is generally superior to the standard, in spite of the somewhat lower gross density. If the gross densities exhibit the identical gross density, what is ideal, the difference should be even clearer.

TABLE 2

Determination of the mechanical strength of the façade insulation material

| | BINDER 1 | | BINDER 4 | |
|---|---|---|---|---|
| measured value | | gross density | | gross density |
| compression stress untreated | 89.9 kPa | 144 kg/m$^3$ | 102.3 kPa | 141 kg/m$^3$ |
| tear resistance untreated | 27.7 kPa | 144 kg/m$^3$ | 32.6 kPa | 140 kg/m$^3$ |
| tear resistance roughcast | 22.7 kPa | 141 kg/m$^3$ | 28.2 kPa | 138 kg/m$^3$ |
| point load at 5 mm | 730 N | 140 kg/m$^3$ | 940 N | 139 kg/m$^3$ |

There are different requirements as regards the mechanical properties of the material for the clamping felt of the second example, as it is only used in the interior. This product is very light which renders the use of the above mentioned method for determining the tear resistance impossible, as mechanical stability of this insulation material as such is only low. Ring-shaped test pieces are punched out of the clamping felt and torn by means of a suitable measuring equipment in order to determine the measurement value described as hoop tear strength. As the tear strengths in longitude direction and in transverse direction to the product are different from each other, they are determined separately. The results are shown in table 3.

TABLE 3

Hoop tear strength of clamping felt

| MEASURED VALUE | UNIT | BINDER 2 | BINDER 5 | CHANGE OF BINDER 2 TO BINDER 5 (ROUNDED) IN % |
|---|---|---|---|---|
| longitudinal hoop tear strength | N/g | 5.3 | 5.5 | 4 |
| transversal hoop tear strength | N/g | 4.1 | 4.8 | 17 |
| hoop tear strength with regard to gross raw density | N/g | 4.8 | 5.2 | 8 |

The mechanical characteristics of this product, as well, are improved when ethanolamine/molasses are used in the binder. Of course, the changes compared to the standard are not very impressive with this product due to its general low strength. The improvements of the characteristics shown with the products can also be shown by simple test methods in the laboratory. By means of the hydrolytic resistance showing the mass loss of the binder during heating in water, it can be found out whether loading agents hinder the polymerisation that occurs during curing. In order to determine the hydrolytic stability, a suitable amount of binder is cured, triturated and dried until constancy of weight is reached, 4 g of the respective binder powder are boiled 5 hours in 1.2 l water, afterwards filtered off and again dried until constancy of weight. The mass loss results from the difference of binder weighed before and after the procedure. As phenol-formaldehyde resins comprise different functionalities, this measurement is carried out at the pH 4.0; 7.0 and 10.0.

The results compared to a NH₃-containing binder are shown in FIG. 1, in which the mass loss in percent is shown at different pH values.

These studies surprisingly revealed that amino alcohol containing binder resins (binders 4-6) generally exhibits a higher resistance against dissolving in water than the NH₃ standard (binders 1-3).

In order to further control the quality with regard to the general processability of the new amino alcohol containing binders that are practically free of NH₃ the gelling times that are important for the creation of crossing points between the individual fiber loops, exemplified with ethanolamine, of three binders according to the invention 4-6 compared with NH₃ containing binders 1-3 of the prior art were studied at 130° C. The results are shown in FIG. 2. The ordinate shows the so called B-time, i.e. the rate at which the initiated polymerisation starts. The B-time should lie within a certain time limit that is already determined by the standard binders, which already result in good final products. If the B-time is too short, the polymerisation runs too fast and a shaping of the bonded but not yet cured binders is no longer possible. However, if the B-time is too long, not enough binder is applied to the fibers leading to a considerable decrease of product quality as regards the mechanical properties.

It has turned out that the gelling times for the binders 4 and 5 are even shorter than those for NH₃-containing binders, whereas are somewhat higher than the prior art for the other phenol-formaldehyde resin type in binder 6. However, they are still admissible for this type of gel.

No deterioration of the mechanical properties was observed caused by the use of ethanolamine/molasses.

In the operating test it was shown that no particular difficulties are expected during the preparation of the encollage with ethanolamine and molasses. Further, it has proved advantageous that fewer problems arise as regards weighing, compared to binders containing ammonia, when mixing by hand.

With the given technical conditions, there are no problems arising with the technical application of the binders according to the invention. No precipitation or plugging was observed.

The encollage could be used without any special occurrences. No increased bad smell, pre-curing or deferred drying was observed.

The product properties are not disadvantageously affected by the use of ethanolamine/molasses. The samples could not be distinguished visually from the standard products. No deterioration of the mechanical characteristics and of the water absorption property was observed. The data given by the laboratory tests were thus confirmed.

The measurement values shown in FIGS. 1 and 2 were similar to those of binders containing propanolamine, N,N-dimethylethanolamine and N-methylethanolamine.

At present, ethanolamine is the preferred amino alcohol due to its presently superior availability in industrial amounts at reasonable prices and due to its perfect (almost inexistent) fire and ignition performance, however, the tests performed showed clearly that, on principle, the invention can be carried out with any claimed compound.

The invention claimed is:
1. A method for producing bonded mineral wool, in which a phenol-formaldehyde-binder is applied onto the still hot fibers after the fiberization of a mineral melt,
a binder, which is essentially free of ammonia, and contains hydroxylamine or an amino alcohol with the following general formula:

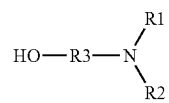

wherein R1 and R2 are the same or different from each other, and independently are hydrogen, a linear or branched, saturated or unsaturated alipathic hydrocarbon with 1-12 carbon atoms, a saturated or unsaturated alicyclic or heterocyclic hydrocarbon with 5-8 carbon atoms, a carbocyclic or heterocyclic aromatic hydrocarbon with 5-12 ring members or a straight chain or branched alkylether with 1-50 alkoxy units or a straight chain or branched alkylamine with 1-50 alkylamine units; and R3 is a linear or branched, saturated or unsaturated aliphatic hydrocarbon with 1-12 carbon atoms, a saturated or unsaturated alicyclic or heterocyclic hydrocarbon with 5-8 carbon atoms, a carbocyclic or heterocyclic aromatic hydrocarbon with 5-12 ring members or a straight chain or branched alkylether with 1-50 alkoxy units or a straight chain or branched alkylamine with 1-50 alkylamine units; and wherein a sugar-containing preparation is added.

2. The method according to claim 1, wherein the ethanolamine is an amino alcohol.

3. The method according to claim 1, wherein the sugar-containing preparation is added in the concentration of 0.5 to 25 percent by weight.

4. The method according to claim 1, wherein an acidic salt is additionally added to the binder.

5. The method according to claim 1, wherein a binder with a content of approximately 0.05 to 4 percent by weight of an amino alcohol is used.

6. The method according to claim 1, wherein a binder with additionally approximately 0.1 to 3.0 percent by weight of an acid salt is used.

7. The method according to claim 6, wherein a binder with a concentration of ammonium sulphate of approximately 1.0 percent by weight is used.

8. The method according to claim 7, wherein the binder has an ethanolamine concentration of approximately 0.5 percent by weight and a ammonium sulphate concentration of approximately 1.0 percent by weight.

9. A bonded mineral wool product that is obtainable according to the procedure in accordance with claim 1.

10. A binder for the preparation of a phenol-formaldehyde resin based bonded mineral wool, comprising a sugar-containing preparation and an hydroxylamine or an amino alcohol of the following general formula:

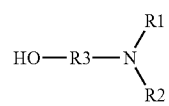

wherein R1 and R2 are the same or different from each other, and independently are hydrogen, a linear or branched, saturated or unsaturated aliphatic hydrocarbon with 1-12 carbon atoms, a saturated or unsaturated alicyclic or heterocyclic hydrocarbon with 5-8 carbon atoms, a carbocyclic or heterocyclic aromatic hydrocarbon with 5-12 ring members or a straight chain or branched alkylether with 1-50 alkoxy units or a straight chain or branched alkylamine with 1-50 alkylamine units; and R3 is a linear or branched, saturated or unsaturated aliphatic hydrocarbon with 1-12 carbon atoms, a saturated or unsaturated alicyclic or heterocyclic hydrocarbon with 5-8 carbon atoms, a carbocyclic or heterocyclic aromatic hydrocarbon with 5-12 ring members or a straight chain or branched alkylether with 1-50 alkoxy units or a straight chain or branched alkylamine with 1-50 alkylamine units, wherein the binder is essentially free of ammonia.

11. The binder according to claim 10, which comprises ethanolamine.

12. The binder according to claim 10, further comprising an ammonium salt.

13. The binder according to claim 10, comprising an amino alcohol content of approximately 0.05 to 2.5 percent by weight.

14. The binder according to claim 10, comprising an ammonium salt in a concentration of approximately 0.1 to 3.0 percent by weight.

15. The binder according to claim 14, comprising an ammonium salt concentration of approximately 1.0 percent by weight.

16. The binder according to claim 14, comprising concentration of the amino alcohol in an amount of approximately 0.5 percent by weight and ammonium salt in an amount of approximately 1.0 percent by weight.

17. The binder according to claim 10, wherein the sugar containing preparation is present in the binder in a concentration of 0.5 to 25 percent by weight.

* * * * *